March 4, 1958 A. T. NABSTEDT ET AL 2,825,236
REVERSE GEAR
Filed Dec. 18, 1952 6 Sheets-Sheet 1

INVENTORS
A. T. Nabstedt
A. S. Gorshkoff
BY
ATTORNEYS

March 4, 1958 A. T. NABSTEDT ET AL 2,825,236
REVERSE GEAR
Filed Dec. 18, 1952 6 Sheets-Sheet 2

INVENTORS
A. T. Nabstedt
A. S. Gorshkoff
BY Rockwell & Bartholow
ATTORNEYS

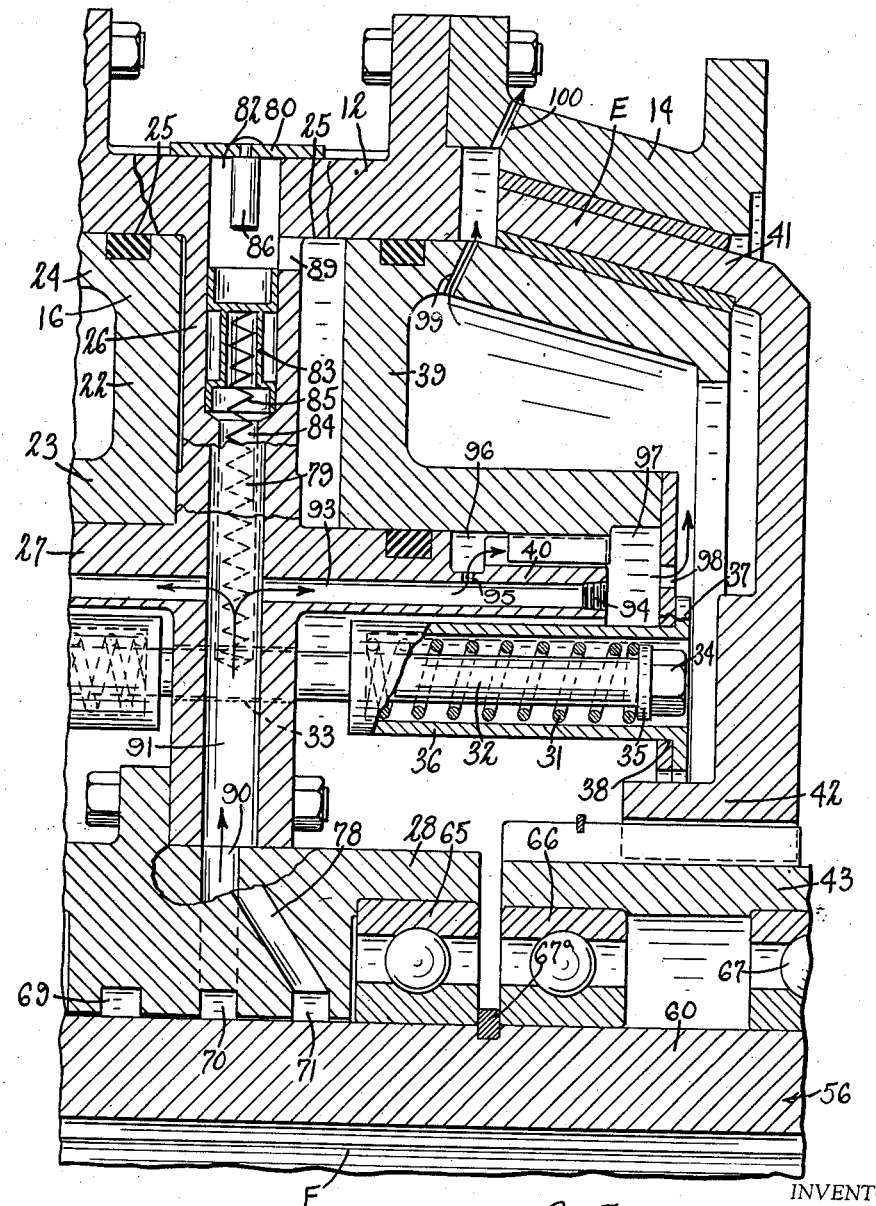

March 4, 1958  A. T. NABSTEDT ET AL  2,825,236
REVERSE GEAR
Filed Dec. 18, 1952  6 Sheets-Sheet 4
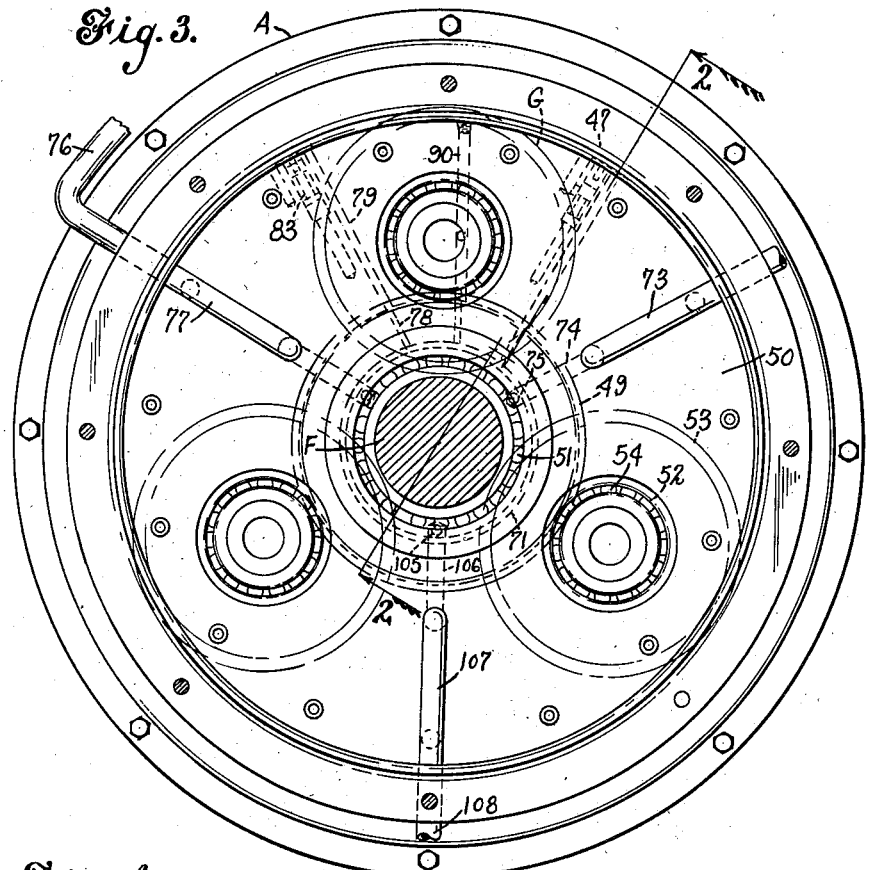
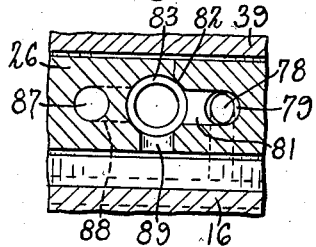
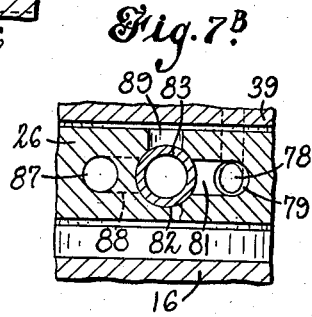
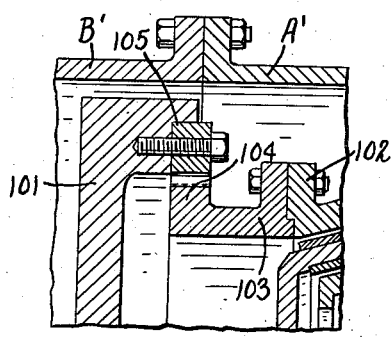
INVENTORS
A. T. Nabstedt
A. S. Gorshkoff
BY Rockwell & Bartholow
ATTORNEYS March 4, 1958 A. T. NABSTEDT ET AL 2,825,236
REVERSE GEAR
Filed Dec. 18, 1952 6 Sheets-Sheet 5

INVENTORS
A. T. Nabstedt
A. S. Garshkoff
BY Rockwell & Bartholow
ATTORNEYS

March 4, 1958    A. T. NABSTEDT ET AL    2,825,236
REVERSE GEAR

Filed Dec. 18, 1952    6 Sheets-Sheet 6

INVENTORS
A. T. Nabstedt
A. S. Gorshkoff
BY Rockwell & Bartholow
ATTORNEYS

United States Patent Office 2,825,236
Patented Mar. 4, 1958

2,825,236

REVERSE GEAR

Arthur T. Nabstedt, Hamden, and Alexis S. Gorshkoff, Oxford, Conn., assignors to The Snow-Nabstedt Gear Corporation, Hamden, Conn., a corporation of Connecticut Application December 18, 1952, Serial No. 326,738

13 Claims. (Cl. 74—377)

This invention relates to reverse gears or transmissions, and has particular reference to those used in boats and other marine equipment where a prime mover drives a propeller shaft or other output shaft.

One of the objects of the present invention is to provide a substantial improvement in the general organization of the reverse gear parts with a view to providing a reverse gear which is simpler and stronger than those heretofore used and less liable to malfunctioning and injurious wear.

Another purpose of the invention is to furnish an improvement that deals especially with the gearing used in causing reverse movement of the output shaft, and the provisions for supporting this gearing and those causing it to come into operation.

Another object of the invention is to provide a reverse gear having an improved arrangement of clutches and an improved mechanism for actuating the clutches by the pressure of a fluid such as oil, and a more direct manner of introducing the oil pressure to the clutches.

Another object is to provide effective support for the clutch parts and the gearing in the rigid housing.

Another aim is to provide improvements in the provisions whereby the gear is lubricated and cooled.

In the accompanying drawings:

Fig. 2A is a section on a larger scale showing certain parts illustrated in Fig. 2;

Fig. 3 is a section on line 3—3 of Fig. 1;

Fig. 7A is a detail section on line 7A—7A of Fig. 7;

Fig. 7B is a section on line 7B—7B of Fig. 7; and

Fig. 8 is a fragmentary sectional view showing a modification of the front end structure of the gear.

Figure 1:
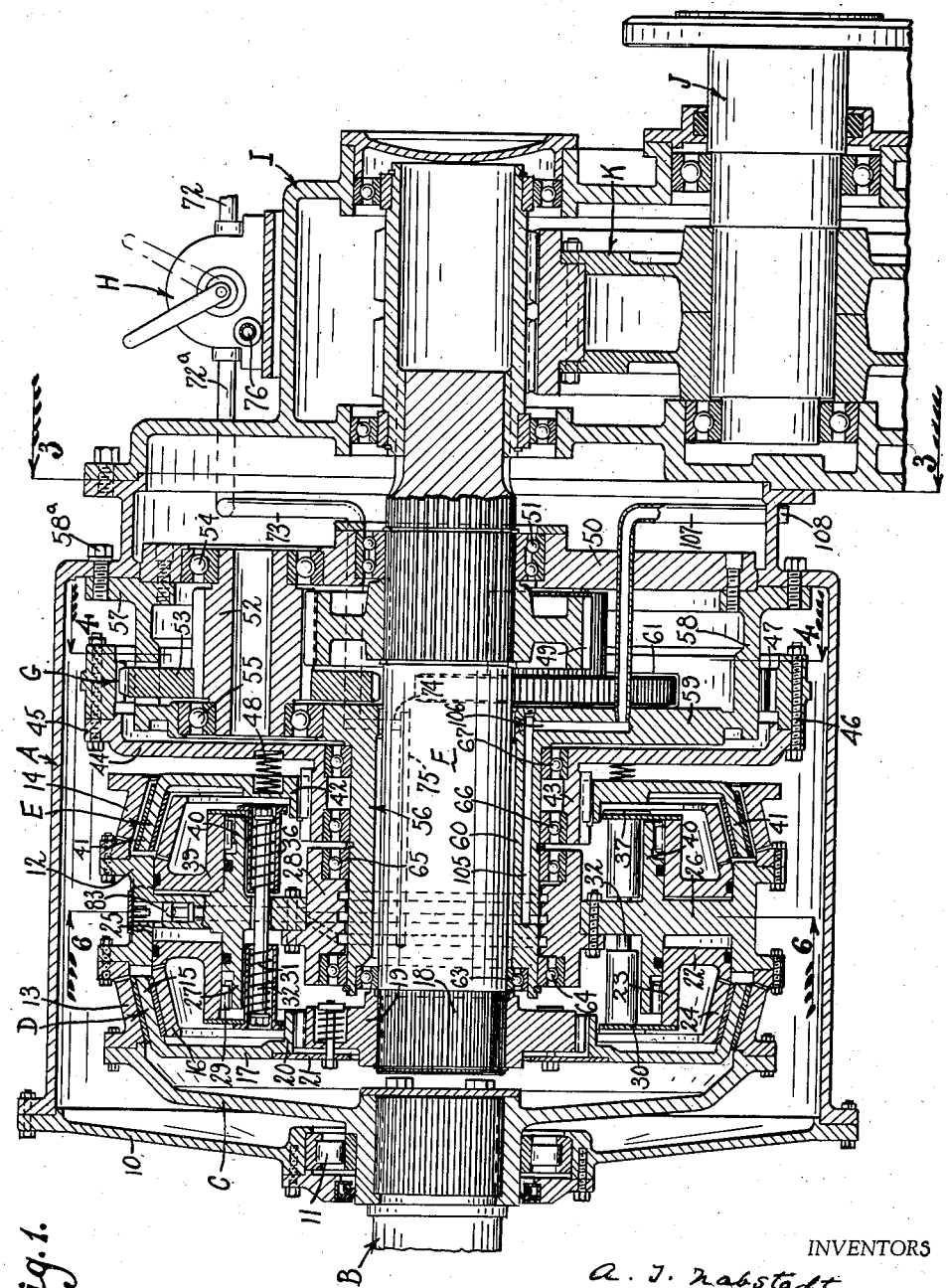
Fig. 1 is a longitudinal vertical section, with parts broken away, of a reverse gear embodying our improvements, the parts being shown in position for forward drive.

The reverse gear shown in Figs. 1 to 7B, inclusive, of the drawings by way of example is one employing a stationary housing provided at the forward end with a bearing for the rear end of an engine-driven shaft, which shaft within the housing carries a rotating driving member in the form of a cup or shell enclosing and adapted to be connected to movable friction clutch elements. These friction clutch elements are adapted to be brought into operation selectively or alternately by fluid-pressure elements having cylinders and pistons, the cylinders being supplied with fluid such as oil from an exterior source and the pistons, when under the pressure of the fluid, acting to connect the friction cluch element to the driving member. within the housing an output shaft is arranged in line with and close to the driving shaft, the output shaft having a bearing in the rear portion of the housing and being supported also near the front end of the housing by an interior housing member, which housing member encloses the output shaft through a substantial portion of the length of the latter and serves, as more particularly described hereinafter, as an internal support for the revolving fluid-actuated friction clutches and also as a support for portions of the reverse gearing. In this particular form the main housing is provided with a rearward extension that furnishes additional support for the output shaft and contains a portion of an offset shaft, together with gearing between the latter shaft and the main output shaft, but the present invention is not concerned with these particular features.

In the drawings, the main housing is indicated at A, the engine-driven shaft at B, the shell-like driving member or flange carried by shaft B, at C, the friction clutch for effecting forward drive at D, and the friction clutch for effecting reverse drive at E. The main output shaft is indicated at F, the gearing used in effecting reverse drive at G, and the distributing valve for controlling admission of pressure fluid to the fluid-pressure members of the clutches at H. In this particular case, the valve H is shown as mounted upon the rearward extension I of the main housing. The offset shaft previously referred to, which may be connected to a propeller shaft, as indicated at J, and the gearing between shaft J and shaft F at K.

The housing A is provided with a front wall 10 in which is mounted a bearing 11 supporting the rear end of the shaft B and the driving member C, which is keyed to the shaft, the driving member C having a forward wall near the wall 10 and having a radially outer wall suitably secured to the forward wall of the driving member. The radially outer wall of the driving member is made up of sections bolted together, there being a middle section 12 and end sections 13 and 14, section 13 being connected to the front wall of the member, and member 14 extending rearwardly and presenting a lip at the rear end of the driving cup or shell. The friction clutch D includes a cone member 15 having friction material on opposite faces, the material on the outer face being adapted to make contact with the inner surface of section 13, which is conical. The inner friction surface of cone member 15 is adapted to make frictional contact with the external conical part of a piston 16. The conical part 15 is formed integrally with a disk 17 extending inwardly toward the forward end of the output shaft F. The forward end portion of this shaft has a splined surface 18 to which is fixed the inner part of a hub 19, the radially outer part of which is splined to engage splines on an axial part 20 integral with the disk 17, which, with the part 15, provides the double-faced movable friction clutch member. A plate 21, rigid with the part 17, overlies the part 19, as shown particularly in Fig. 2, and acts as a stop to limit the rearward movement of the members 15, 17.

Figure 2:
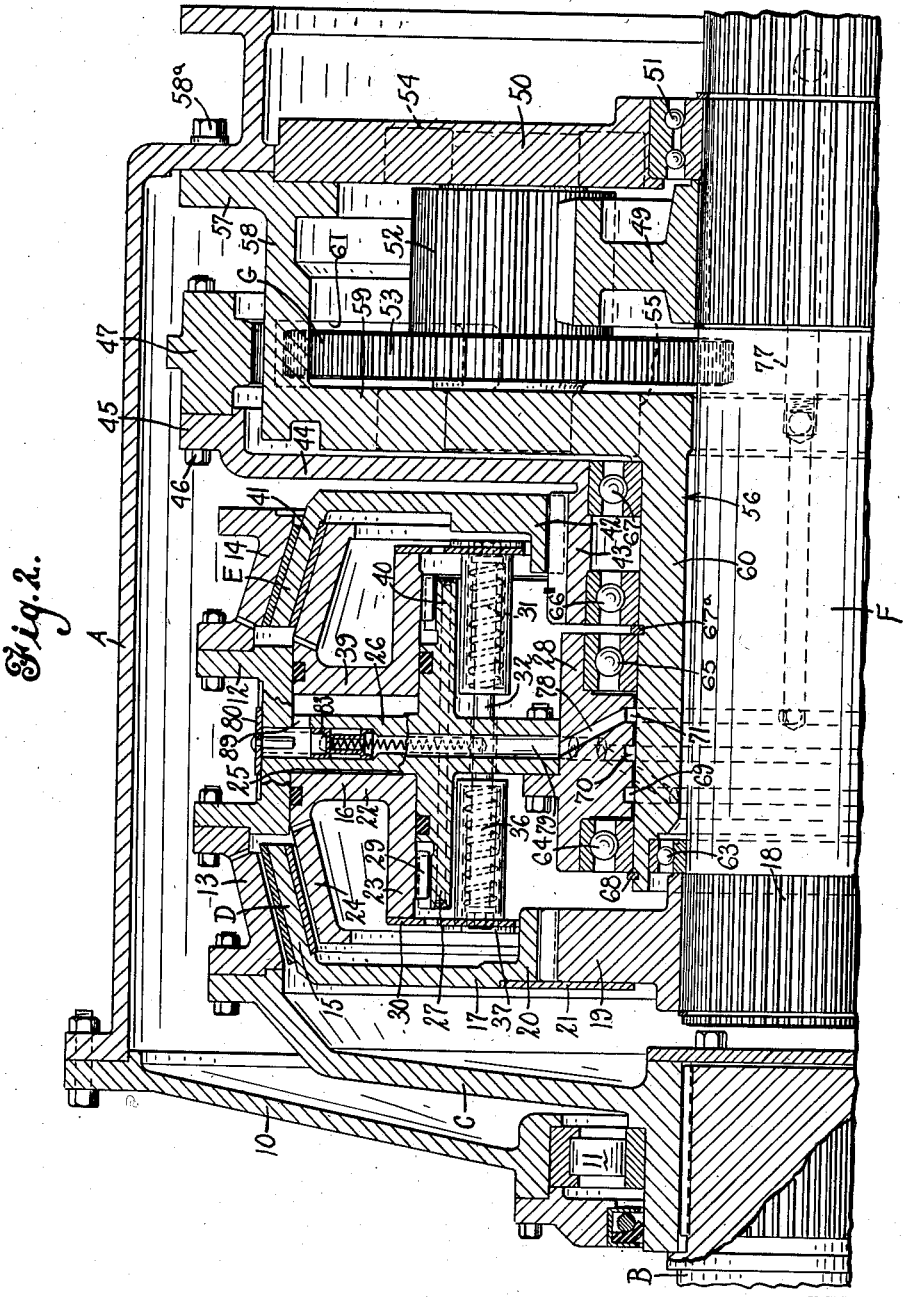
Fig. 2 is an enlarged section on line 2—2 of Fig. 3, with parts broken away, the gear being shown in the reversing position.
Figure 4:
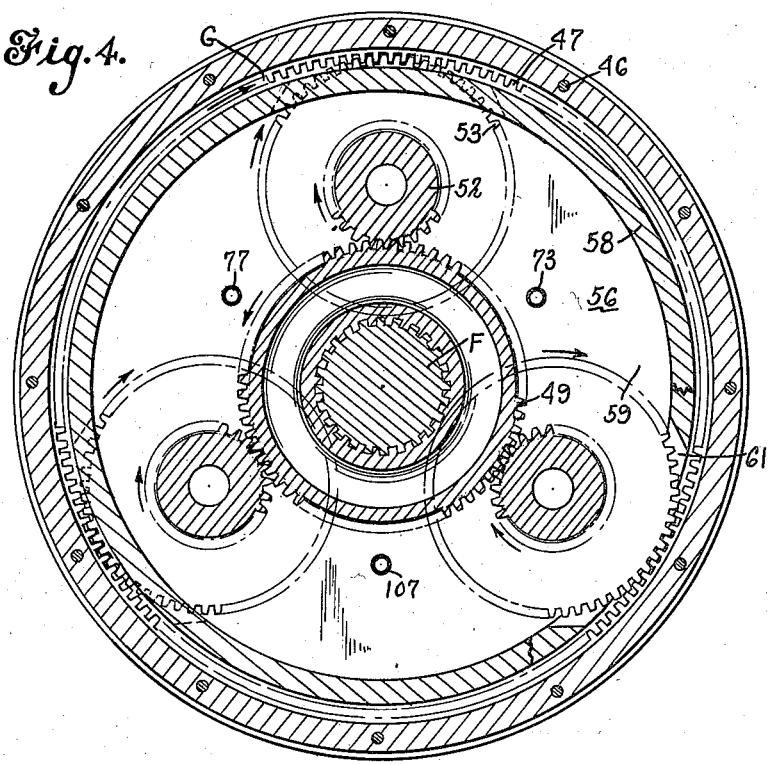
Fig. 4 is a section on line 4—4 of Fig. 1.
Figure 5:
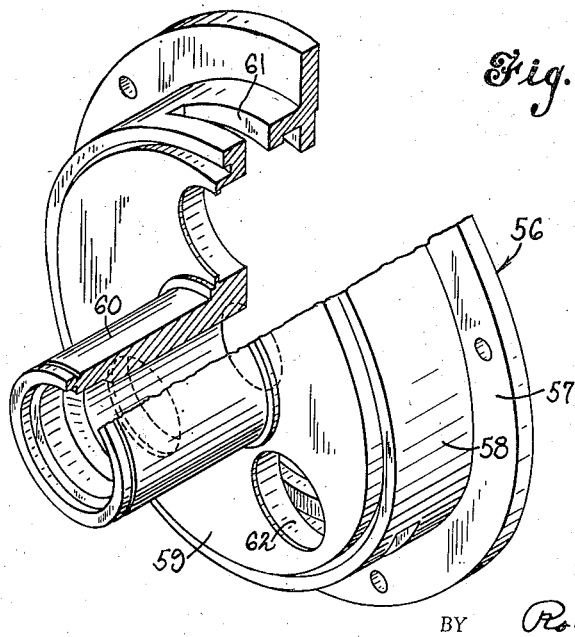
Fig. 5 is a perspective view, partially broken, of a member of the main housing, which encloses certain of the reversing gears.

The piston 16, previously mentioned, has an annular body portion 22 that is faced rearwardly and has integral forwardly extending walls 23 and 24, the wall 23 being a radially inner wall, and 24 being a radially outer wall that is inclined forwardly and inwardly, as shown in Fig. 2, the two walls having between them an open mouth portion, as shown in Fig. 2, and the inclined wall 24 being the part of the piston member which contacts the clutch element 15, 17. The piston 16 is of cylindrical form at its rear portion and is received in a fluid-pressure cylinder 25, this cylinder being formed in part by the driving shell section 12 and in part by portions shown as made integral with that section, namely, a web portion 26 and a circular rib 27 that extends forwardly from the web. The web 26 extends radially inwardly beyond the rib 27 and has an inner edge abutting a distributing ring 28, hereinafter described, the member 28 having a flange abutting the web and bolted thereto, as shown in Fig. 2.

Reverting to the piston 16, this piston has on its wall 23 radially inwardly extending splines 29 engaging splines provided on the rib member 27 whereby the piston is prevented from having rotative movement in its cylinder. Suitable packing is interposed between the cylinder walls and the piston, as shown in the drawings. The forward end of the piston wall 23 has attached thereto a plate 30 which extends in a radially inward direction and is acted upon by springs in a manner such that the piston is normally held in a retracted or inoperative position. The spring arrangement involves a helical spring 31 embracing a rod 32 which extends loosely through an opening 33 passing through the web member 26. One end of the rod carries a nut 34 abutted by a washer 35 which confines one end of the spring 31. The other end of the spring engages the bottom of a cup-like member 36, the bottom of the cup being perforated so as to embrace the rod 32. The cup 36 has an open end in which the forward end of the rod is accommodated, and at the open mouth of the cup there is provided a lateral flange 37 which is engaged with the forward face of the plate 30, which plate is provided at the lower part with a hole 38 in which the forward wall portion of the cup is slidably received. The spring 31, acting against the bottom of the cup 36, causes the flanged mouth of the cup, acting on the plate 30, to urge the piston 22 rearwardly, i. e., toward the inoperative position (Fig. 2).

The friction clutch E is substantially a duplicate of the clutch D, the principal difference being that the relative arrangement of the parts of the clutch is reversed so that the clutch is engaged by rearward rather than forward movement of the piston. Here the piston 39 has the same form as piston 22 and is similarly mounted, the radially inner part of the piston embracing a rearwardly extending circular rib 40 on the web member which is identical with the rib 27. The rod 32, previously mentioned, continues through the web member, and the spring mechanism mounted upon its rear portion is the same as that previously described. The movable clutch member 41 of clutch E is substantailly identical with the member 15, 17, but the member 41 has a radially inner sleeve part 42 in splined engagement with a sleeve portion 43 rigid with a web 44 the rim portion 45 of which is suitably clamped as by bolts 46 to an internal gear or ring gear 47. The gear 47 forms a part of the gear assembly G, which is more particularly described hereinafter.

The clutch member 41, and the web 44, which forms a part of the internal gear structure, have interposed between them a helical spring 48 the function of which is to urge clutch member 41 toward the released position.

The gears of the gear assembly or gear set G include a gear 49 fixed to the shaft F forwardly of a partition member 50 extending transversely across the rear portion of the main housing A, and rearwardly of the gear 49 the shaft F is supported revolubly in the partition 50 by a suitable antifriction bearing 51. The gear 49 is in mesh with parts of a number (three in this case) of duplex pinions, each such pinion having as a part thereof a pinion member 52 which is in engagement with the gear 49, and a pinion member 53 of greater diameter that is in mesh with the teeth on the inner surface of the ring gear 47. In the case shown, the pinion portion 53 is a separate member rigidly held on pinion portion 52, but if desired the pinion structure could be made in one piece. These duplex pinions are mounted in bearings which are in fixed relationship to the housing of the reverse gear. In the case illustrated, the pinions have their rear ends revolubly mounted by antifriction bearings 54 in the partition member 50 (Fig. 1), while their forward ends are revolubly mounted by means of antifriction bearings 55 in a member 56 that is fixed within the housing A forwardly of the partition 50. This member 56 is located rearwardly of the web which supports the ring gear, and it encloses parts of the gear set G, and it also serves, as hereinafter described, as an internal support for the ring gear and for the driving member of the reverse gear and the friction clutch mechanism associated with this driving member.

In the particular form here disclosed, the member 56, which has these functions, has a cup-like body 58 the mouth of which is rearwardly disposed and is provided with an integral flange 57 suitably secured as by bolts 58a to a part of housing A which is in line with the partition 50. The cup-like member 56 has a body 58 and a wall or bottom 59 extending radially inwardly and integrally connected to a sleeve member 60 which extends forwardly from the body of member 56 and encloses with clearance a substantial length of the shaft F. The body or wall 58 of member 56 is provided with slots 61 through which portions of the pinion parts 53 protrude to engage the ring gear 47. The wall or bottom 59 is provided with apertures 62 into which are inserted the bearings 55 of the duplex pinion members.

The sleeve portion 60 of the member 56 has a mouth portion extending into adjacency to the hub 19 on shaft F, and in this location the sleeve is counterbored to receive an antifriction bearing 63 which supports the shaft near its forward end. The annular distributing member or ring 28, previously mentioned, is rotatably supported upon the sleeve with antifriction bearings 64 and 65 interposed, as best shown in Fig. 2, these bearings being received in rabbets provided in the ring or annulus adjacent its forward and rear edges. The ring 28 is close to the hub 43 of the ring-gear structure 44, 45, 47, and the hub 43 is rotatably supported from the sleeve 60 by antifriction bearings 66 and 67, the latter of these two bearings being close to the forward face of the transverse wall or bottom of member 56 so as to be held in place by the last-mentioned member. The hub 43 may be spaced from the distributing ring 28 by suitable means such as a split ring member 67a engaging a groove in the sleeve, and a similar member 68 can be used at the forward edge of the distributing ring, as shown in Fig. 2. In the present construction the distributing ring is provided at its radially inner face with three transverse grooves, namely, a forward groove 69, a middle groove 70, and a rear groove 71. The function of groove 69 is to distribute pressure fluid such as oil to the cylinder of the clutch D, and similarly the rear groove 71 distributes pressure fluid to the clutch E. The middle groove 70 serves to conduct lubricating oil as hereinafter described. For the purposes mentioned, the grooves are in communication with passages radially arranged in the web 26, as hereinafter described.

In the present embodiment, the distributing valve H, previously mentioned, controls the distribution of pressure fluid which has been placed under pressure by a pressure source not shown, and which is used to activate the clutches D and E, and this fluid is enabled to enter the groove 69 or the groove 71, as the case may be, depending upon the adjustment of valve H. On the other hand, the lubricating oil under pressure, arriving from an extraneous source, not shown, passes to the groove 70 independently of the valve H through connections hereinafter described. Pressure fluid passes into the valve H by way of a pipe 72, and from the casing of the valve a delivery pipe 72a leads to a pipe 73 which is directed radially inwardly rearwardly of the partition 50, and thence forwardly, as shown in Fig. 1, so as to communicate with a lateral passage 74 in the wall 59 of part 56. Passage 74, in turn, communicates with a longitudinal passage 75 in the sleeve 60, and this longitudinal passage leads to the groove 69. From the distributing valve H another pipe, indicated at 76, leads into the rear part of the main housing so as to communicate with a radially disposed pipe portion 77, and this pipe portion 77 is connected to groove 71 by passage means including portions similar to the passages 74 and 75. Each of the grooves 69 and 71 leads to valve means controlling the admission of pressure fluid to the respective cylinders and the exhaust of fluid from the cylinders, and in this particular case there are three such valves for each cylinder, making six in all, and the passageways for all six valves are for the greater part located in the web 26, and the valves themselves are mounted in this web. Also located in this web are passages which carry lubricating oil, supplied to the middle groove 70, to the pistons and adjacent parts.

Figure 6:
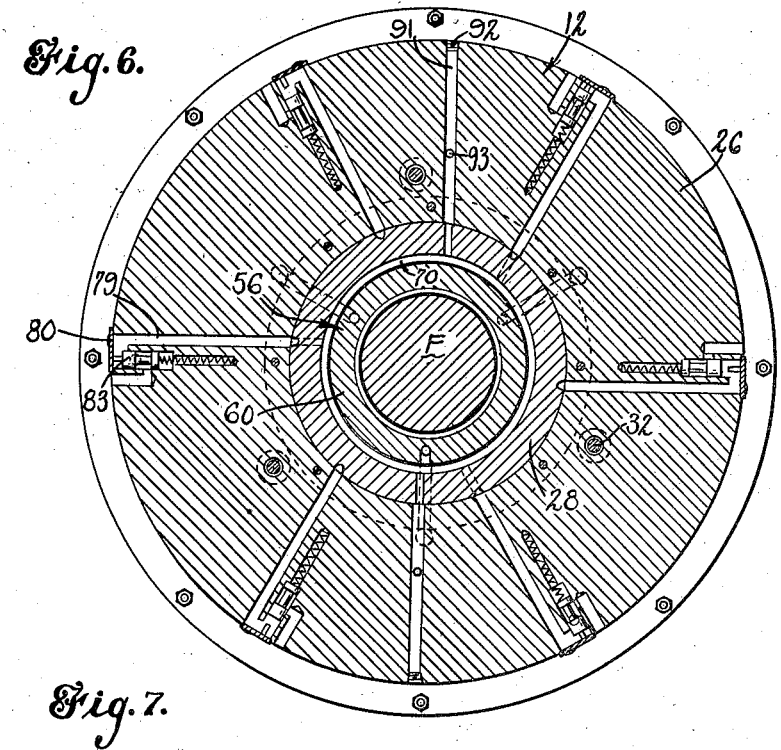
Fig. 6 is a section on line 6—6 of Fig. 1.

As shown in Fig. 6, the pressure-controlling valves and their associated passages are preferably arranged alternately so that, while as regards a given valve and its passages the pressure fluid comes from one groove in the distributing ring and can reach a certain cylinder, the next valve will receive fluid from the other groove and provide for its delivery into the other cylinder. In the distributing ring 28 are inclined passages such as 78 (Fig. 2) which lead from the pressure fluid grooves to the center of the web 26, and in the center of the web are arranged the passages and valves shown in Fig. 6.

Figure 7:
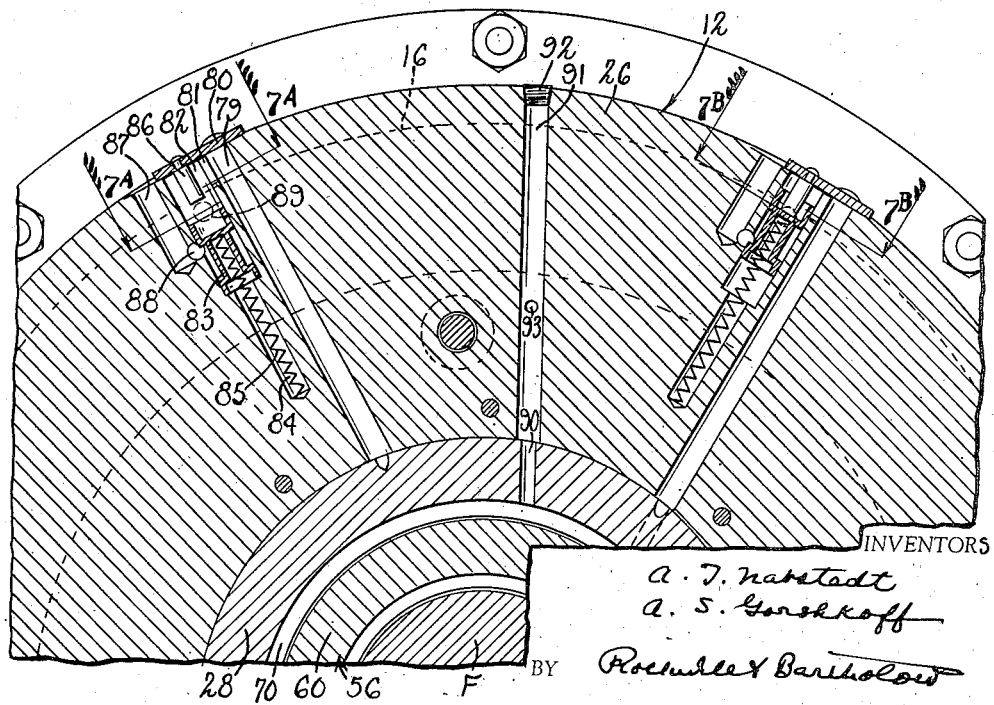
Fig. 7 is an enlarged fragmentary view showing two of the valves illustrated in Fig. 6.

In the upper parts of Figs. 6 and 7, the valve at the left is one controlling admission of fluid to clutch D (forward drive) and the one at the right is used for controlling clutch E (reverse drive). As the structure of all of these valves is identical, a description of one will suffice, and it will be noted that Fig. 7 shows one valve in the clutch-energizing position and the other one in the clutch-releasing position.

Leading radially outwardly in the web from the inclined passage in the distributing ring is a passage 79, the outer end of which is enclosed by a plate 80, and under the plate 80 is a recess 81 which leads to a valve chamber 82. Slidable in the valve chamber 82 is a sleeve valve 83 of generally cylindrical tubular shape having enlarged cup-like ends, the cup at the upper end (Fig. 7) having a closed bottom and the cup at the lower end having an open bottom. Below the valve chamber 82 (Fig. 7) is a bore 84 in which is a coil spring 85 that urges the valve in a radially outward direction so as to maintain the bottom of the upper cup against a pin 86 carried by the plate 80. At the side of the valve chamber 82 which is opposite the passage 79 there is provided a short bore 87 closed at the inner end and open at the outer edge of the web, and this short bore 87 may be in communication with the valve chamber 82 by way of a port 88. In the side surface of the valve chamber 82 is a port 89, and, depending upon the position of the sleeve valve, this port is placed in communication with or cut off from the pressure-fluid cylinder of the clutch. The left-hand position of the valve in Fig. 7 is one in which pressure fluid passes into the cylinder while, on the other hand, the bore 87, which is the exhaust bore, is shut off by the upper end or head of the valve. In the right-hand position, the valve closes the inlet port and opens the exhaust port so that the pressure fluid can discharge from the edge of the web 26.

With regard to the intermediate groove 70 of the ring 28, this leads by passages 90 to two bores 91 extending throughout the radial dimension of the web 26. Each of these bores 91 is, however, closed at the outer end by a plug 92, and intermediate the ends of each passage communication is provided with a lateral passage 93 in the circular rib portion or flange of the web. The passage 93 is provided by a bore extending through the rib formation 27, 40 and the web, and having a closing plug 94 at each end. The passages 91, as shown in Fig. 6, are two in number in this particular case and these are located between certain of the passages 79 previously described. By having a common bore or passage 93 extending through the web and its two rib portions, the body of lubricating oil moving radially outwardly in one of the passages 91 can divide, as indicated by the arrows in Fig. 2ᴬ, so that part of it can go to the "forward" clutch and part to the "reverse" clutch. The provisions for lubricating the two clutches are identical and a description of those in connection with the "reverse" clutch (Fig. 2ᴬ) will suffice. It will be noted that, intermediate the length of the lateral passage between bore 91 and the rear edge of the rib 40, a port 95 leads to a groove 96 in the rib, the arrangement being such that oil moving into the rib 96 is free to pass between the splines of the rib and of the piston into a rearwardly located chamber 97 provided conjointly by the rib, the piston, and by the plate 30 which is fixed to the piston. This plate 30 is provided with a port 98 that provides an exit from the chamber 97 and by this arrangement the oil is enabled to move forward and into the mouth of the hollow piston in a generally radially outward direction. This outward movement of the oil is assisted by centrifugal action. The oil entering the piston moves to the radially outer part of the piston over the inclined radially outward piston wall until it reaches a port 99, and from this port the oil passes to an exit port 100 in the driving shell structure, from which port it will be discharged into the main housing so as to move by gravity to the supply of oil maintained in the usual way in the lower part of the housing.

It is to be noted that oil reaching the groove 96 will have access to the radially inner wall of the piston so as to lubricate the piston, and that the oil passing out of the port 99 will ubricate the piston in the region of its radially outer wall. In this manner the contacting surfaces of the piston and cylinder will be thoroughly lubricated, this action being continuous as the oil line is constantly under pressure, and as the clutch structure is constantly subject to centrifugal force as long as the driving shell or member is in rotation. The friction material carried by the clutch elements mounted between the pistons and the driving shell is of such nature as not to be adversely affected by the lubricant.

The lubricant which is to be supplied to the pistons, as above described, reaches the groove 70 by way of a longitudinal passage 105 in the sleeve member 60 (see Fig. 1), which passage 105 is in communication with a supply passage 106 in the wall 59 of housing member 60, the passage 106 in turn being in communication with a supply pipe 107 in the rear part of the main housing. This pipe 107 has an exteriorly projecting portion 108 that is in communication with a source of lubricant under pressure, not shown.

In the preceding description the shaft B is referred to as an engine-driven shaft. This can conveniently be a stub shaft interposed between the shaft of the engine or other prime mover and the reverse gear and having its rear end supported in the manner previously described. Such a shaft can be either rigidly or flexibly connected with the shaft of the prime mover without requiring additional supports and without throwing an additional load on the bearings of the shaft of the prime mover. However, if desired, the driving member of the reverse gear can be connected directly to the flywheel of the prime mover, as shown in Fig. 8. Here the housing B' of the prime mover is connected as by bolts to the open end of the reverse gear housing A'. The flywheel 101 of the prime mover is connected to the hollow driving member 102 of the reverse gear by an annular member 103 which is a flanged member, one flange of which is connected as by bolts to the driving member 102. The other flange of member 103, indicated at 104, is provided with splines, and these are in engagement with splines on a ring 105 bolted to the rear portion of the flywheel rim. This, however, is only by way of example, as various other arrangements can be adopted for connecting the prime mover to the driving member of the reverse gear.

It will be understood that, in the operation of the reverse gear, forward drive will be secured by actuating the clutch D to connect the driving member C with the hub 19 at the forward end of shaft F. Such actuation is secured by manipulating valve H in such a manner that pressure oil passes to the groove 69 in the distributing ring to move the respective valves under pressure of incoming oil to the position shown at the left of Fig. 7. This causes pressure fluid to be admitted to the forward clutch cylinder, causing the forward piston to engage the clutch member 15, 17 with the member C. In this manner shaft B is directly connected with shaft F. When it is desired to reverse the rotation of shaft F, distributing valve H is moved to cut off the supply of pressure fluid to the forward clutch, and as a consequence the pressure fluid begins its exhaust from the forward cylinder, and the parts subject to spring pressure, as above described, are returned to their initial positions. When the distributing valve on further movement is moved to the position for "reverse," pressure fluid is admitted to groove 71 in the distributing ring and the clutch member 41 is engaged with driving member C. The drive will then be from member C to clutch member 41, to internal gear member 47, to the duplex pinions 53, 52, and to the gear 49. The rotation of the duplex pinions will be in the same direction as that of the internal gear and therefore the gear 49 fixed on shaft F will be rotated in a reverse direction. It will be understood that when the reverse gear is in the neutral position, that is, when neither of the clutches D and E is engaged with the driving member, the driving member rotates as long as the prime mover is in rotation, and this driving member carries with it the fluid-pressure pistons and their cylinders, together with certain provisions for distributing the pressure medium to the cylinders and certain provisions for distributing the lubricant. All of these parts are carried by the driving member in an interior position providing additional weight and increasing the flywheel effect. In the mechanism as disclosed here, the cylinders are provided in part by a portion of the driving shell, in part by the web, which in this particular case is integral with a section of the driving shell, and in part by the rib formation. The mechanism rotating with the driving member includes, of course, the distributing ring 28, which rotates on antifriction bearings about the sleeve part of the internal housing structure, the grooved part of the ring being held out of contact with the sleeve part so that there is no wear on this portion of the ring. In the neutral position the clutch elements 15 and 41 are clear of the driving member and the respective pistons, and have no movement which imparts movement to shaft F.

When the gear is in the position for reverse, the clutch element 41 is clamped and rotated and the internal gear member 47 rotates with its supporting hub 43 turning on antifriction bearings which are interposed between it and the housing sleeve 60. In this manner a very satisfactory stationary bearing is provided for the internal gear. The duplex pinions of the gear set also have stationary bearings in the housing, as above described. The housing member 56 not only provides a support for the distributing ring and the driving member and associated parts but also provides a support for the internal gear and certain (forward) bearing supports for the duplex pinions, and, moreover, this member additionally provides, as above described, a number of distributing passages for the pressure medium and the lubricant.

It is of interest that, between the distributor-ring grooves provided in part 28 for the forward and reverse clutches, is interposed a similar groove which conducts the lubricating and cooling fluid. This has the advantage that fluid leaking or escaping from the passages or ducts supplying the forward and reverse clutches passes into the intermediate lubricant groove so as to increase the quantity of the lubricant, obviating any interchange or mixing of pressure fluid between the supply ducts for the clutches.

One of the advantages of a reverse gear of the described construction arises from the fact that the two friction clutches are mounted for rotation on a central member which is a part of the stationary housing of the reverse gear, that is to say, on a supporting member which does not rotate but provides an axis for the rotation of the clutches. This arrangement has, among other things, the advantage that the connection of the prime mover to the driving element of the reverse gear is facilitated, as has been described above. The driven shaft F is very strongly supported by a housing arrangement such as described extending throughout a substantial portion of the shaft length and supplying a bearing part for the shaft quite near the forward end of the main housing. Among other things, this enables a bearing for another shaft to be placed in the main housing in close adjacency to the shaft F, as in the form first described. The described housing structure embodying the central supporting hub or sleeve also has obvious advantage with regard to the introduction and distribution of the pressure fluid such as oil to the clutches. It is also of distinct advantage that all of the gears embodied in the gear set G are provided with fixed supports that are parts of the gear housing. The arrangement of parts is such that the gear is very strong and compact and that the power from the prime mover is transmitted very directly to the output shaft both in forward and reverse.

It is understood, of course, that in the forward drive position the only parts which do not have driving rotation imparted thereto are the movable reverse clutch element, the internal gear of the gear set, and the duplex pinions of the gear set.

A distinct advantage of the present reverse gear is that, owing to the absence of planetary gears, the gears employed for obtaining reverse movement move at relatively low speeds, which reduces wear and heating, and it is obviously advantageous that these gears have fixed rather than movable supports.

A further advantage of the described construction arises from the fact that in making replacements or repairs access to the clutch mechanism can be had from the forward end of the main housing. It will be apparent that in disassembling the clutch structure a number of the parts can be slid in a forward direction for removing them from the housing through the front end of the latter.

While only one form of reverse gear, with certain modifications, is disclosed in the drawing, it is to be understood that various other forms and modifications can be adopted and various detail changes made without departing from the principles of the invention or the scope of the claims.

What we claim is:

1. In a reversing mechanism, a rotary driving member, a shaft having one end in proximity to said driving member, a main housing portion enclosing said shaft, friction-clutch means for connecting said end of the shaft to said driving member, a gear fixed to said shaft intermediate of the ends of the latter, an assembly of gear members including an internal gear and sets of pinions cooperating with said gear to drive the shaft in a reverse direction, friction-clutch means for connecting one member of said gear assembly with said driving member, and a second housing portion in fixed relationship to the first housing portion providing fixed axes of rotation for said internal gear and said sets of pinions, and also providing internal fixed support for the driving member and the two friction-clutch means, said second housing portion comprising a hollow body enclosing said pinion sets and having a projecting sleeve or hub surrounding said shaft.

2. In a reversing mechanism, a rotary driving member, a shaft having one end in proximity to said driving member, friction-clutch means for connecting said end of the shaft to said driving member, a fluid-pressure cylinder and piston for actuating said friction-clutch means, gear members adapted to act on said shaft at a point intermediate of its ends to drive the shaft in the reverse direction, friction-clutch means for connecting one of said gear members with said driving member, and a fluid-pressure cylinder and piston for actuating said last-named friction-clutch means, a main housing portion enclosing said driving member and said shaft, and an ancillary housing portion in fixed relationship to the main housing portion providing interior support for said driving member and its associated friction-clutch means and fluid-pressure members.

3. In a reversing mechanism, a rotary driving member, a shaft having one end in proximity to said driving member, friction-clutch means for connecting said end of the shaft to said driving member, gear members operable to drive the shaft in a reverse direction from a point intermediate of the ends of the shaft, friction-clutch means for connecting one of said gear members with said driving member, fluid-pressure means comprising a cylinder and piston for actuating each of said friction-clutch means, said pistons being annular pistons enclosed within the driving member, fluid-pressure distributing means disposed radially inwardly of said pistons and rigid with the cylinders, and means including a fixed sleeve enclosing a portion of said shaft which provides internal support for the driving member, the friction-clutch means and the said fluid-pressure distributing means.

4. A reversing mechanism as defined in claim 3, in which the distributing means comprises a ring provided with bearings which support it from said sleeve.

5. A reversing mechanism as defined in claim 4, in which said ring has fluid-pressure grooves facing toward said sleeve and spaced from each other, and a lubricant groove between said fluid-pressure grooves.

6. In a reversing mechanism, a rotary driving member, a shaft extending rearwardly from said driving member, friction-clutch means for connecting the forward end of said shaft to said driving member, gear members operable to drive the shaft in a reverse direction from a point intermediate the ends of the shaft, friction-clutch means for connecting one of said gear members with said driving member, fluid-pressure means comprising a cylinder and piston for actuating each of said friction-clutch means, a main housing enclosing the driving member and shaft, and a supplemental housing member fixed within the main housing and having a sleeve extending forwardly around the shaft and providing a support for the forward end of the shaft.

7. In a reversing mechanism, a rotary driving member, a shaft extending rearwardly from said driving member, friction-clutch means for connecting said shaft to said driving member, gear members operable to drive the shaft in a reverse direction from a point intermediate of the ends of the shaft, friction-clutch means for connecting one of said gear members with said driving member, a main housing enclosing the driving member and the shaft, and a supplemental housing member fixed within said main housing having a sleeve portion internally supporting the respective friction-clutch means and another portion supporting at least one of said gear members.

8. A reversing mechanism as defined in claim 3, in which the means including a fixed sleeve enclosing a portion of the shaft also includes a hollow member integral with the sleeve disposed around the shaft radially inwardly of an internal gear member which is one of said gear members and which hollow member encloses sets of pinions which are other of the aforesaid gear members.

9. In a reverse gear, the combination of a shaft drivable in one direction from one end for forward drive and carrying intermediate of its ends a reversing gear, a housing in which said shaft is journaled, said housing having an interior portion surrounding said shaft, sets of pinions engaging said gear and supported by said portion, an internal gear supported by said portion and engaging said pinions to drive the same, and means to rotate said internal gear in a direction such that said shaft is rotated for reverse drive.

10. In a reverse gear, a rotary driving member, a shaft having one end in proximity to said driving member, a housing portion enclosing said shaft, friction-clutch means for connecting said end of the shaft to said driving member provided with an actuating fluid-pressure cylinder and piston, gear members adapted to act on said shaft at a point intermediate of its ends to drive the shaft in the reverse direction, friction-clutch means for connecting one of said gear members with said driving member having an actuating fluid-pressure cylinder and piston, and a housing portion fixed interiorly of the first housing portion having a sleeve member provided with passages conducting pressure fluid to the cylinders of both of said friction-clutch means.

11. In a reversing mechanism, the combination of a first shaft adapted to drive from one end a second shaft, a power-driven member in the form of a flange adjacent the other end of the first shaft, a hub fixed to the first shaft adjacent said power-driven member, said power-driven member having a conical recess facing toward the second shaft, friction-clutch means in sliding keyed engagement with the peripheral portion of said hub, including a member having a cone surface adapted to engage said conical recess, said power-driven member having an additional conical recess in opposed relation to the first recess, friction-clutch means engageable with the second conical recess, gearing operable from said last-mentioned clutch means for rotating the first shaft in a reverse direction, and hydraulically operated actuating means for both of said friction-clutch means, the driving member, both of said friction-clutch means and said actuating means having a fixed interior support in the form of a sleeve member surrounding the first shaft.

12. In a reversing mechanism, a rotary driving member, a shaft extending rearwardly from said driving member, friction-clutch means for connecting said shaft to said driving member, gear members operable to drive the shaft in a reverse direction from a point intermediate of the ends of the shaft, friction-clutch means for connecting one of said gear members with said driving member, a main housing enclosing the driving member and the shaft, and a member fixed within said main housing having a first portion internally supporting said friction-clutch means and a second portion supporting at least one of said gear members, the first portion of said fixed member being a sleeve part surrounding the shaft and providing a forward bearing therefor, and the second portion being a hollow part enclosing certain of said gear members in the form of duplex pinions.

13. In a reversing mechanism, a rotary driving member, a shaft having one end in proximity to said driving member, a main housing portion enclosing said shaft, friction-clutch means for connecting said end of the shaft to said driving member, a reversing gear fixed to said shaft intermediate of the ends of the latter, an assembly of gear members cooperating with said gear to drive the shaft in a reverse direction, including an internal gear and sets of pinions, friction-clutch means for connecting one member of said gear assembly with the driving member, and a supplemental housing portion in fixed relationship to the main housing portion and located within the latter, the supplemental housing portion having a fixed sleeve part embracing and providing a support for said shaft, said internal gear being mounted on said sleeve part, and the supplemental housing portion having an enlarged hollow part at one end of the sleeve part and in fixed relation thereto, said sets of pinions being mounted in said hollow part.

(References on following page)

References Cited in the file of this patent

UNITED STATES PATENTS

| Number | Name | Date |
|---|---|---|
| 654,798 | Leary | July 31, 1900 |
| 1,846,879 | Kurth | Feb. 23, 1932 |
| 1,947,847 | Harvey | Feb. 20, 1934 |
| 2,055,970 | Fiffard | Sept. 29, 1936 |
| 2,077,663 | Batten | Apr. 20, 1937 |

FOREIGN PATENTS

| Number | Country | Date |
|---|---|---|
| 602,749 | Great Britain | June 2, 1948 |
| 443,823 | Italy | Jan. 7, 1949 |
| 673,737 | Great Britain | June 11, 1952 |